United States Patent [19]
Fischer et al.

[11] Patent Number: 6,035,340
[45] Date of Patent: Mar. 7, 2000

[54] METHOD AND APPARATUS FOR PROVIDING A MULTIPLE-RING TOKEN RING HUB EXPANSION

[75] Inventors: Keith Fischer, Sunnyvale; Corey Selby, Hollister, both of Calif.; Kevin G. Smith, Austin, Tex.

[73] Assignee: Nortel Networks Corporation, Montreal, Canada

[21] Appl. No.: 08/820,568

[22] Filed: Mar. 19, 1997

[51] Int. Cl.[7] .................................................. G06F 13/00
[52] U.S. Cl. .......................... 709/249; 709/250; 709/251
[58] Field of Search ........................ 395/200.79, 200.81; 709/249, 251, 250; 370/463, 420, 489, 351, 353; 341/110, 126

[56] References Cited

U.S. PATENT DOCUMENTS

| | | | |
|---|---|---|---|
| 4,731,784 | 3/1988 | Keller et al. ............................. | 359/136 |
| 5,301,303 | 4/1994 | Abraham et al. ........................ | 709/223 |
| 5,485,455 | 1/1996 | Dobbin et al. ........................... | 370/255 |
| 5,621,893 | 4/1997 | Joh ........................................... | 709/249 |
| 5,712,983 | 1/1998 | Vergnaud et al. ....................... | 709/250 |
| 5,825,775 | 10/1998 | Chin et al. .............................. | 370/401 |

Primary Examiner—Zarni Maung
Assistant Examiner—Jason D. Cardone
Attorney, Agent, or Firm—Blakely Sokoloff Taylor & Zafman LLP

[57] ABSTRACT

A method and apparatus for expanding multiple token rings by interconnecting multiple multi-ring hubs. The computer networking hubs of the present invention are operable to support multiple token ring networks. In addition, the networking hubs of the present invention include a cable interface configured to interconnect the multiple token ring networks to a single cable interconnected with a separate hub, which is also configured to support multiple token rings. As a result, multiple token rings are able to be expanded across multiple networking hubs.

In one embodiment, the networking hubs of the present invention are further operable to receive signals from remote nodes via a first signal mode. The signals are converted to a second signal mode to be transmitted internally. To transmit the signals to a separate hub, the signals are re-converted to the first signal mode and transmitted to a separate networking hub via the first signal mode. Transmitting between the separate hubs via the first signal mode helps to preserve the signal integrity and decrease the cross-talk between the wires of the cable interconnecting the hubs.

16 Claims, 2 Drawing Sheets

METHOD AND APPARATUS FOR PROVIDING A MULTIPLE-RING TOKEN RING HUB EXPANSION

FIELD OF THE INVENTION

The present invention relates generally to computer networking systems, and in particular, relates to expanding multiple token rings by interconnecting multiple multi-ring hubs.

BACKGROUND OF THE INVENTION

Several computer systems in a local area network (LAN) may be joined together by a single component commonly referred to as a hub. The hub typically serves as common network termination point for multiple computer systems, as is shown in FIG. 1.

The computer systems provided in the LAN (otherwise referred to as Nodes, when interconnected to a hub) may communicate with each other via the hub. For example, node 12 may send a signal addressed to node 14. The signal will first be transmitted from the node 12 to the hub 10. The signal will then be transmitted from the hub to node 14.

The hub 10 may also provide the nodes with access to other separate LANs. That is, the hub 10 may be connected with a cable which is connected to a separate second hub, which provides access to a second LAN. As a result, the nodes attached to hub 10 can also send messages and signals to the second LAN via the hub 10.

A network architecture commonly implemented using a hub is referred to as the token ring architecture. The token ring network architecture uses a ring network topology and a token-passing strategy to control access to the network.

A single token ring implemented in a hub may be extended into a larger token ring by joining two or more hubs. The technique of joining multiple hubs is sometimes referred to as cascading. In the prior art, however, the interconnecting of multiple hubs may only be used to extend a single token ring.

On the other hand, additional intelligence may be implemented on the hub 10 to support multiple separate LANs (i.e., separate token rings). In such a case, the hub is referred to a multi-ring hub. For example, in FIG. 1, if hub 10 is a multi-ring hub, nodes 12 and 14 may makeup a first token ring, while nodes 14 and 18 may provide a second token ring.

However, the prior art does not provide a method for extending multiple token rings by joining a set of multi-ring hubs. As such, there is a need for a method and apparatus of extending multiple separate token rings by cascading multi-ring hubs.

SUMMARY OF THE INVENTION

The present invention provides a method and apparatus for expanding multiple token rings by interconnecting multiple multi-ring hubs. The computer networking hubs of the present invention are operable to support multiple token ring networks. In addition, the networking hubs of the present invention include a cable interface configured to interconnect the multiple token ring networks to a single cable interconnected with a separate hub, which is also configured to support multiple token rings. As a result, multiple token rings are able to be expanded across multiple networking hubs.

In one embodiment, the networking hubs of the present invention are further operable to receive signals from remote nodes via a first signal mode. The signals are converted to a second signal mode to be transmitted internally. To transmit the signals to a separate hub, the signals are re-converted to the first signal mode and transmitted to a separate networking hub via the first signal mode. Transmitting between the separate hubs via the first signal mode helps to preserve the signal integrity and decrease the cross-talk between the wires of the cable interconnecting the hubs.

BRIEF DESCRIPTION OF THE DRAWINGS

The present invention is illustrated by way of example and not limitation in the figures of the accompanying drawings, and in which.

DETAILED DESCRIPTION

A method and apparatus are described for extending multiple separate token rings by cascading multiple multi-ring hubs. In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Figure 1:
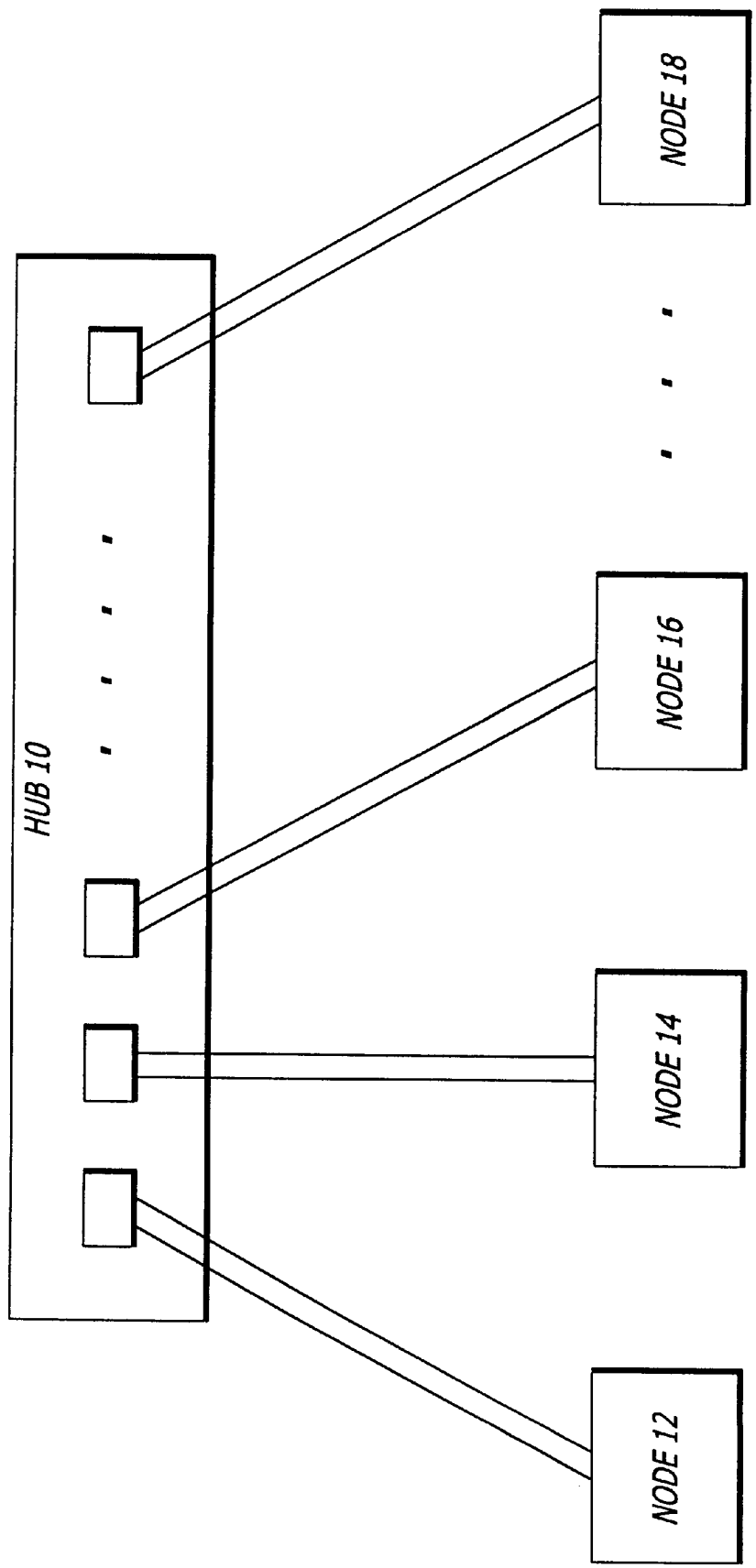
FIG. 1 illustrates a hub interconnecting several computer systems.
Figure 2:
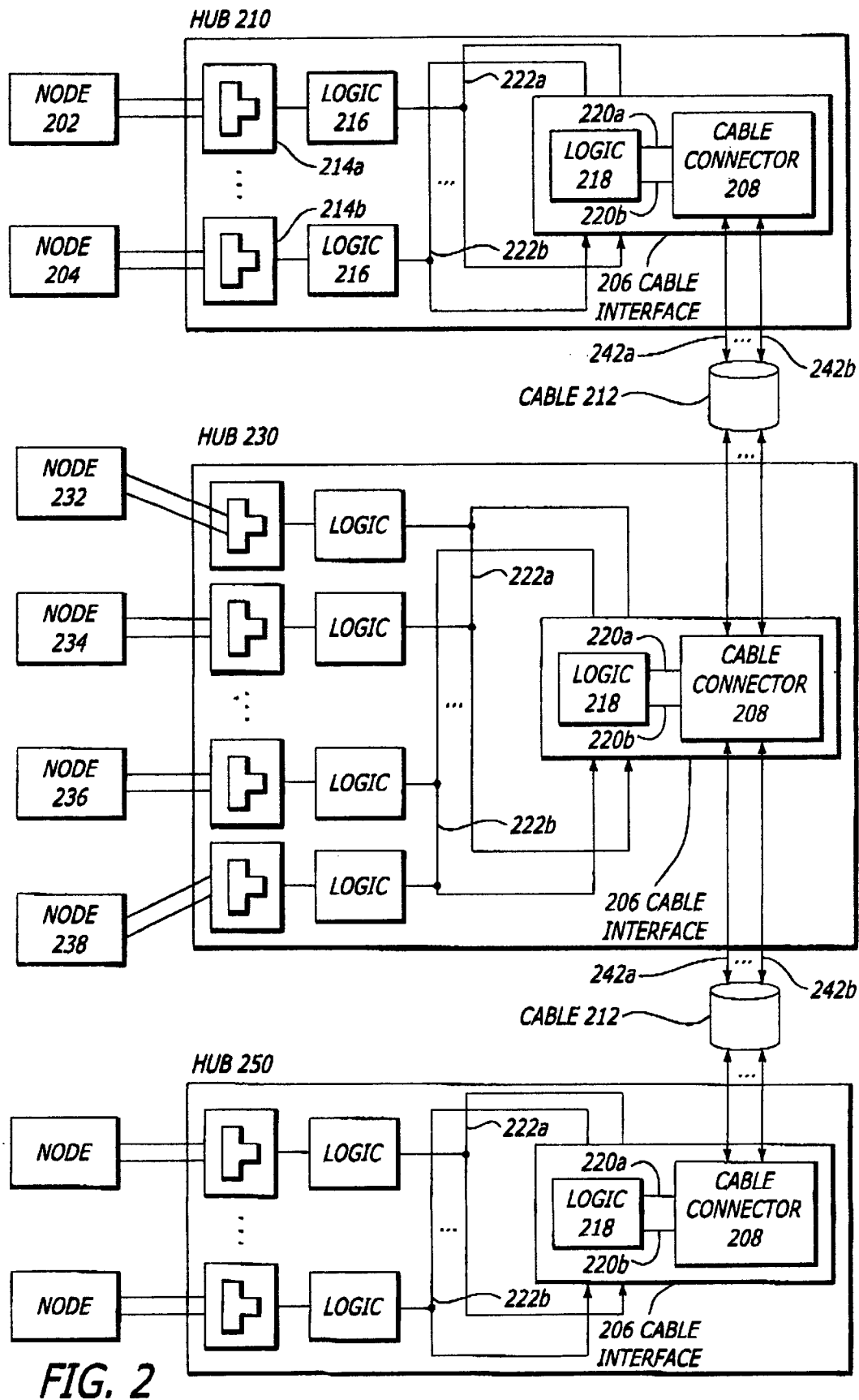
FIG. 2 illustrates the expansion of multiple token rings by interconnecting of multiple multi-ring hubs, according to one embodiment of the present invention.

FIG. 2 illustrates the interconnection of multiple multi-ring hubs according to one embodiment of the present invention. As shown in FIG. 2, a set of token ring hubs are interconnected by a single cable 212. Each of the hubs may operate as multi-ring hubs. That is, the hubs are configured to support multiple separate token rings among the nodes interconnected with the respective hubs.

In particular, as shown in the hub 210, a set of connectors 214a–214b provide nodes 202–204 with a point of connection to hub 210. The nodes are typically interconnected to the hub via an analog line such as a telephone line. As such each of the connectors 214a–214b are typically coupled to circuit logic 216a–216b configured to convert the data and signals received from the nodes into digital information. Once converted into digital information, the data and signals can be transmitted throughout hub 210.

In addition, in the case of multi-ring hubs, the logic 216a–216b coupled to the connectors 214a–214b may further be configured to connect the respective node with a particular token ring path. For example, in hub 210, the logic 216a may be configured to connect node 202 with the token ring 222a, and the logic 216b may be configured to connect node 204 with the token ring 222b.

The present invention enables the expansion of multiple token rings of a multi-ring hub by interconnecting multiple multi-ring hubs. For example, the present invention may enable a first group of nodes attached to hub 230 (e.g., nodes 232–234) to be interconnected with the token ring 222a, which is expanded from hub 210. In addition, a second group of nodes attached to hub 230 (e.g., nodes 236–238) may be interconnected with the token ring 222b, which is also expanded from hub 210. As a result, the token rings 222a and 222b are expanded throughout several hubs, which in effect may allow easier upgrades in the field as users requirements change.

In one embodiment of the present invention, the expansion multiple token rings across multi-ring hubs is achieved by providing a unique cable interface 206 at each of the multi-ring hubs. In particular, in one embodiment, the cable interface 206 is configured to keep the token rings separate when transmitting the token ring signals between the multi-ring hubs.

In one embodiment, the cable interface 206 of the present invention has at least one cable connector 208. The cable connector of the present invention is configured to connect with a cable 212 having multiple wires $242_a$–$242_b$. Each separate wire in the cable is able to transmit signals and data corresponding to a separate token ring.

The cable connector 208 individually interconnects multiple physical token rings of a hub with corresponding wires of the cable 212. For example, the cable connector 208 of the hub 210 may interconnect token ring 222$a$ with the wire 242$a$ of cable 212, and interconnect token ring 222$b$ with the wire 242$b$ of cable 212, etc. In alternative embodiment, additional cable connectors may be provided to interconnect additional cables between the multi-ring hubs.

In an alternative embodiment, to better preserve the signal integrity of the multiple token rings and prevent cross-talk when transmitting across the wires, circuit logic 218 is provided in the cable interface 206. The circuit logic 218 may perform a logic level translation on the token-ring signals before the signals are transmitted across the wires. In one embodiment, the signals are re-converted from digital to analog signals.

The signals may also be further conditioned by the logic 218. For example, in one embodiment, the token ring signals may be re-timed by a phase-lock-loop circuit to place the signals within pre-determined bit cell boundary times. The re-timing of the signals helps re-correct the encoding of the signals (e.g. re-correct the Manchester encoding).

In alternative embodiments, the present invention may be applicable to implementations of the invention in integrated circuits or chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

The logic of expanding multiple token rings by cascading multiple multi-ring hubs may alternatively be provided, at least in part, as a computer program product which may include a storage medium having stored thereon instructions which can be used to program a computer to perform a process according to the present invention. The storage medium can include, but is not limited to, any type of disk including floppy disks, optical disks, CD-ROMs, and magneto-optical disks, ROMs, RAMs, EPROMs, EEPROMs, magnet or optical cards, or any type of media suitable for storing electronic instructions.

Furthermore, in the foregoing specification, the invention has been described with reference to specific exemplary embodiments. It will, however, be evident that various modifications and changes may be made without departing from the broader spirit and scope of the invention. The specification and drawings are, accordingly, to be regarded in an illustrative rather than restrictive sense.

What is claimed is:

1. A first networking hub operable to provide a common termination point for multiple nodes, the first networking hub comprising:

a first cable interface operable to transmit signals corresponding to multiple separate local area networks (LANs) to a second networking hub, the first and second networking hubs both operable to support multiple separate LANs, the first cable interface is operable to interconnect each of the separate LANs to a separate wire within a single cable to be interconnected with the second networking hub, the cable interface is further operable to transmit the signals in an analog format simultaneously to the second networking hub.

2. The first networking hub of claim 1, wherein the multiple separate LANs are token ring networks.

3. The first networking hub of claim 1, wherein the first cable interface consist of a single cable connector.

4. The first networking hub of claim 3, wherein the first networking hub includes a set of second connectors operable to receive signals from a first set of nodes, in a first signal mode;

the first networking hub operable to transmit the signals internal to the first networking hub via a second signal mode; and the cable interface operable to convert the signals from the second signal mode to the first signal mode and transmit the signals to the second networking hub via the first signal mode.

5. The first networking hub of claim 1 further comprises a switching system product.

6. The first networking hub of claim 1 further comprises a transmission system product.

7. A method of interconnecting separate networks, the method comprising:

interconnecting a first networking hub with a separate second networking hub, the first networking hub and the second networking hub both operable to support a first local area network (LAN) and a second LAN, the first and second LANs being separate; and transmitting signals from the first networking hub to the second networking hub, the signals corresponding to the first and second LANs, each of the separate LAN signals transmitted to the second networking hub via a separate wire within a signal cable, the separate LAN signals transmitted simultaneously to the second networking hub via an analog mode.

8. The method of claim 7, wherein the first and second LANs are token ring networks.

9. The method of claim 7, wherein the transmitting of the signals includes transmitting the signals from the first networking hub to the second networking hub via a first single connector.

10. The method of claim 9, wherein the first networking hub includes a set of second connectors operable to receive signals from a first set of nodes, in a first signal mode, and the first networking hub operable to transmits the signals internal to the first networking hub via a second signal mode; and the step of transmitting the signals further includes transmitting the signals from the first hub to the second hub via the first signal mode.

11. The method of claim 7, wherein the first networking hub comprises a switching system product.

12. The method of claim 7, wherein the first networking hub comprises a transmission system product.

13. A first networking hub operable to provide a common termination point for multiple nodes, the first networking hub comprising:

multiple separate local area networks (LANs); and a first cable interface interconnected to the multiple LANs, the first cable interconnected to a second networking hub, the cable configured to transmit the multiple LANs between the first and second networking hubs, the cable interface is configured to interconnect each of the separate LANs to a separate wire within a single cable to be interconnected with the second networking hub, the cable interface further configured to transmit the signals simultaneously to the second networking hub via an analog mode.

14. The first networking hub of claim 13, wherein the first networking hub is operable to receive signals from a first set of nodes in a first signal mode, the first networking hub is operable to convert the signals to a second signal mode to transmit the signals internal to the first networking hub, and the first networking hub is further operable to convert the signals from the second signal mode to the first signal mode and transmit the signals to the second networking hub via the first signal mode.

15. The first networking hub of claim 14 further comprises a switching system product.

16. The first networking hub of claim 14 further comprises a transmissions system product.

* * * * *